United States Patent [19]

Saunders et al.

[11] Patent Number: 5,007,814

[45] Date of Patent: Apr. 16, 1991

[54] DEVICE FOR SEPARATING AND CLOSING A SPLIT MOLD HAVING TWO HALVES

[76] Inventors: Raymond L. Saunders, 16895 Town Hall Rd., Walworth, Wis. 53184; Joseph M. Forrestal, 1800 Patton Pl., Janesville, Wis. 53546

[21] Appl. No.: 475,035

[22] Filed: Feb. 5, 1990

[51] Int. Cl.[5] ............................................ B29C 45/64
[52] U.S. Cl. ........................................ 425/3; 72/481; 100/249; 100/251; 100/917; 100/918; 164/146; 425/193; 425/195; 425/DIG. 33
[58] Field of Search .................. 29/744; 100/917, 249, 100/918, 251, 214; 72/481, 482; 279/1 R, 1 M; 425/3, DIG. 33, 193, 195; 164/146

[56] References Cited

U.S. PATENT DOCUMENTS

| | | | |
|---|---|---|---|
| 2,672,664 | 3/1954 | Sudziarski | 164/146 |
| 2,679,668 | 6/1954 | Johns | 164/146 |
| 3,128,501 | 4/1964 | Borah | 425/3 |
| 3,159,097 | 12/1964 | White | 100/214 |
| 3,545,044 | 12/1970 | Rebovich et al. | 425/3 |
| 3,779,063 | 12/1973 | Gannon | 279/1 M |
| 4,199,020 | 4/1980 | Buhrer | 164/146 |
| 4,203,484 | 5/1980 | Buhrer | 164/484 |
| 4,460,326 | 7/1984 | Groseck et al. | 425/3 |
| 4,647,273 | 3/1987 | Singh et al. | 425/34.1 |
| 4,666,387 | 5/1987 | Yokota et al. | 279/1 M |
| 4,703,644 | 11/1987 | Waldner | 72/430 |
| 4,804,318 | 2/1989 | Fujieda et al. | 425/34.1 |

FOREIGN PATENT DOCUMENTS 2090190  7/1982  United Kingdom ................. 100/214

*Primary Examiner*—Willard E. Hoag
*Attorney, Agent, or Firm*—Lathrop & Clark

[57] ABSTRACT

A device for separating and closing a split mold that comprises a base, a stationary platen, and a movable platen extending upward from the base and oriented to oppose each other, electromagnets, a hydraulic cylinder, and a control panel. The movable platen is capable of movement toward and away from the stationary platen by the hydraulic cylinder. The stationary platen has the electromagnets mounted thereon and the movable platen has the electromagnets mounted thereon. In the use of the device, the mold is positioned upon the base such that the first half is positioned against the stationary platen. The movable platen is moved against the second half and the electromagnets are activated. The movable platen is then moved away from the stationary platen, and the mold halves are held against their respective platens by the attractive forces of the electromagnets. Mold halves are thus separated by the movement of the platen away from the stationary platen in activation of the electromagnets.

8 Claims, 3 Drawing Sheets

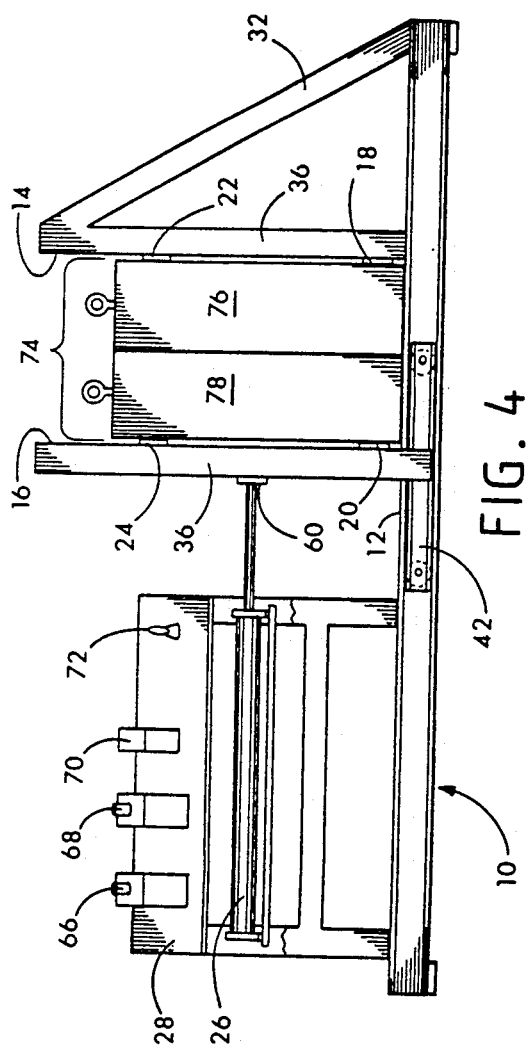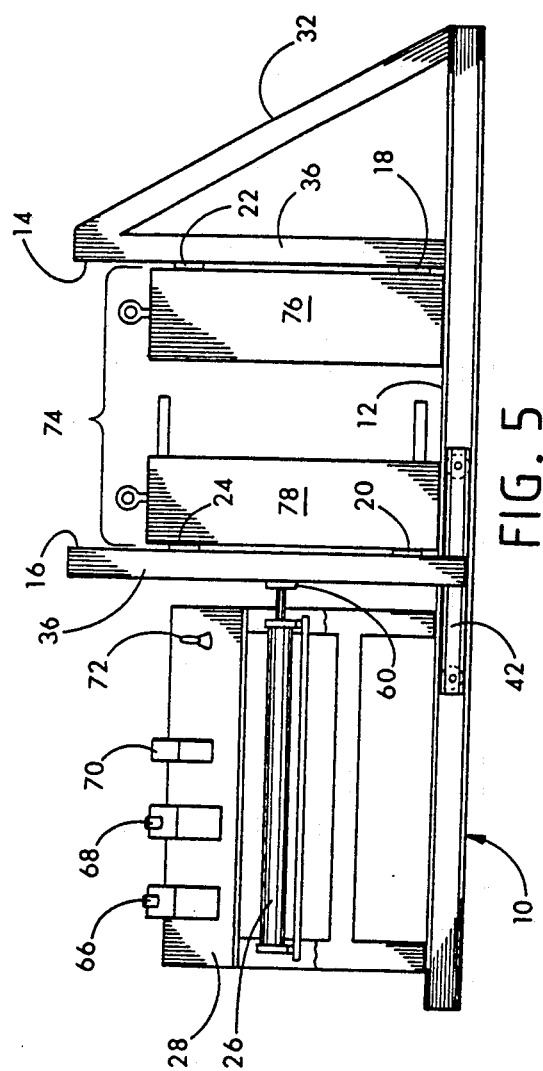

DEVICE FOR SEPARATING AND CLOSING A SPLIT MOLD HAVING TWO HALVES

FIELD OF THE INVENTION

This invention relates to the separation and closing of mold halves outside of the molding machine, for purposes of cleaning or retooling of the mold.

BACKGROUND OF THE INVENTION

It is sometimes necessary to be able to separate or close the halves of a split mold outside of the molding machine, typically for the purpose of cleaning or retooling of the mold. In the methods of the prior art, the mold halves are typically separated by tools such as crowbars and scissor jacks. The closure of the mold halves is then commonly accomplished by use of hitting upon the halves with a sledge hammer. Such methods are crude and often result in dings or dents to the mold, often a highly expensive precision part.

The opening and closing of mold halves by the methods of the prior art are time-consuming and labor-intensive. The mold halves often will bind during the separation or closure of mold halves. Accordingly, a need has existed for a device to separate and close the halves of a mold in an efficient, automated, and non-binding manner that will not result in damage to the mold itself.

SUMMARY OF THE INVENTION

In accordance with the present invention, a device for separating and closing a split mold comprises a base, a stationary platen, a movable platen, lower electromagnets, upper electromagnets, a hydraulic cylinder, and a control panel. The platens extend vertically upward from the base and oppose each other, the movable platen capable of movement toward and away from the stationary platen by the hydraulic cylinder. Each of the platens has an upper and a lower electromagnet mounted therein capable of exerting an attractive electromagnetic force.

In the operation of the present invention, a split mold to be separated having first and second halves is positioned upon the base, the first half of the mold being positioned squarely against the stationary platen. The movable platen is then moved toward the stationary platen until the movable platen has been positioned against the second half of the mold such that any clearances between the mold and the platens have been closed. The electromagnets are then activated and the electromagnets of the stationary platen exert an attractive electromagnetic force upon the first half of the mold to hold the first half of the mold against the station platen and the electromagnets of the movable platen exert an attractive electromagnetic force upon the second half of the mold to hold the second half of the mold against the movable platen. The movable platen is then moved away from the stationary platen and the mold halves are separated as the halves are held to their respective platens. In order to close the mold, the above procedure is performed in reverse.

The position of the upper electromagnets in each of the platens relative to the base may be adjusted to correspond to the height of the mold being separated. The control panel has controls that extend or retract the hydraulic cylinder to cause movement of the movable platen, and also may adjust the strength of the attractive force exerted by the electromagnets according to the weight of the mold being separated.

The present invention prevents damage to the mold such as the dings or dents that may result from attempting to open the mold by crowbars, sledge hammers, or other like tools that might otherwise be used to open and close the mold. The device for separating and closing a split mold of the present invention results in a significant time savings in the man-hours required to open and close the mold, because the mold halves do not ordinarily bind during use of the present invention and because the opening and closing is smooth and more automated.

Further objects, features and advantages of the invention will be apparent from the following detailed description taken in conjunction with the accompanying drawings.

BRIEF DESCRIPTION OF THE DRAWINGS

In the drawings:

FIG. 4 is a side view of the device for separating and closing a split mold with an exemplary mold positioned upon the base against the stationary platen and the rod of the hydraulic cylinder being extended to move the movable platen against the mold.

FIG. 5 is a side view of the device for separating and closing a split mold sequentially following the depiction of FIG. 4 wherein the electromagnets are activated and the rod of the hydraulic cylinder is withdrawn to move the movable platen away from the stationary platen and separate the mold.

DESCRIPTION OF THE PREFERRED EMBODIMENT

Figure 1:
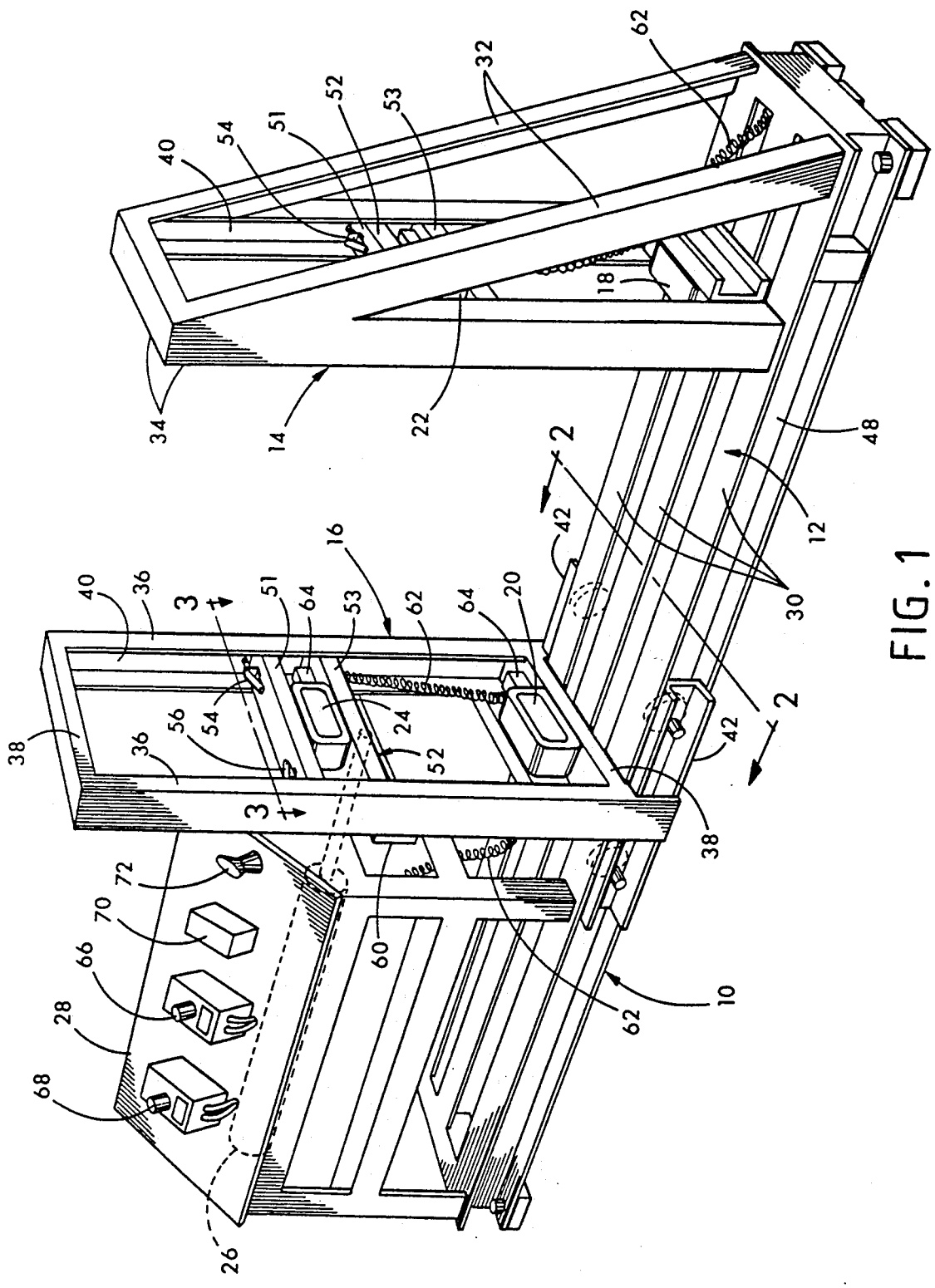
FIG. 1 is a perspective view of the device for separating and closing a split mold.

With reference to the drawings, a device for separating and closing a split mold having two halves is shown at 10 in FIG. 1. The device 10 comprises a base 12, a stationary platen 14, a movable platen 16, lower electromagnets 18 and 20, upper electromagnets 22 and 24, a hydraulic cylinder 26, and a control panel 28.

The base 12 includes three H-beams 30 of substantial length that are parallel to each other in orientation and of even length. The stationary platen 14 extends vertically upward from and is fixedly attached to the base 12 at one end of the beams 30, buttressed by inclined support members 32. The movable platen 16 extends vertically upward from the base 12 and is positioned to oppose the stationary platen 14. The platens 14 and 16 are oriented at right angles to the base 12 and are parallel to each other. The movable platen 16 is capable of travel toward and away from the stationary platen 14, the travel of the movable platen 16 being in the direction of the beams 30. Each of the platens 14 and 16 are formed of a rectangular frame 34 comprising two parallel vertical members 36 and two parallel horizontal members 38. The parallel vertical members 36 of each of the platens 14 and 16 are formed of channel iron having channels 40 facing inwardly toward each other.

Figure 2:
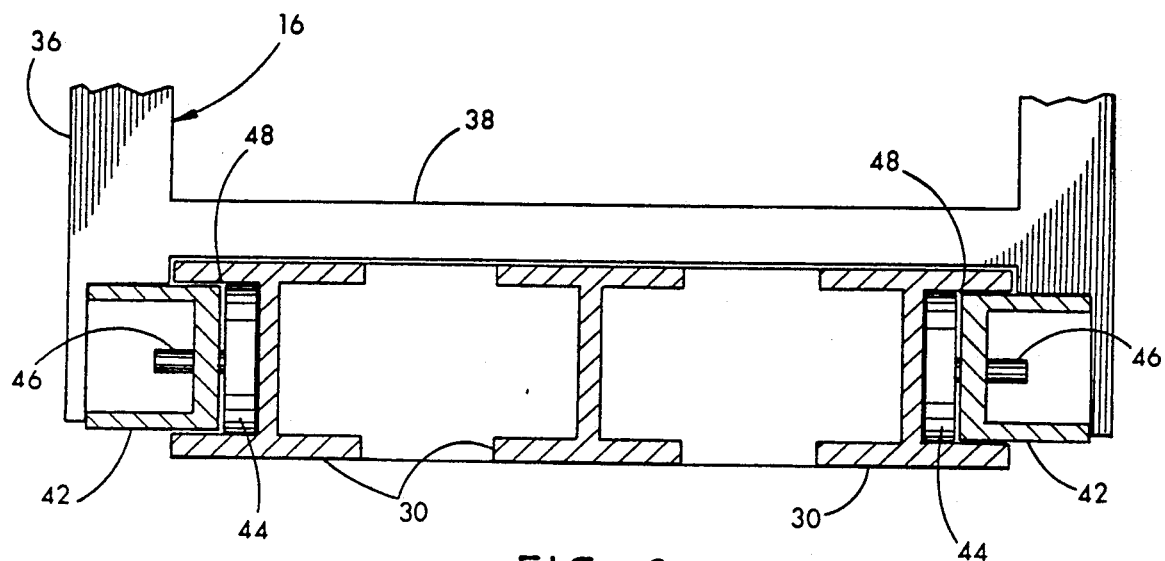
FIG. 2 is a section along line 2—2 of FIG. 1.
Figure 3:
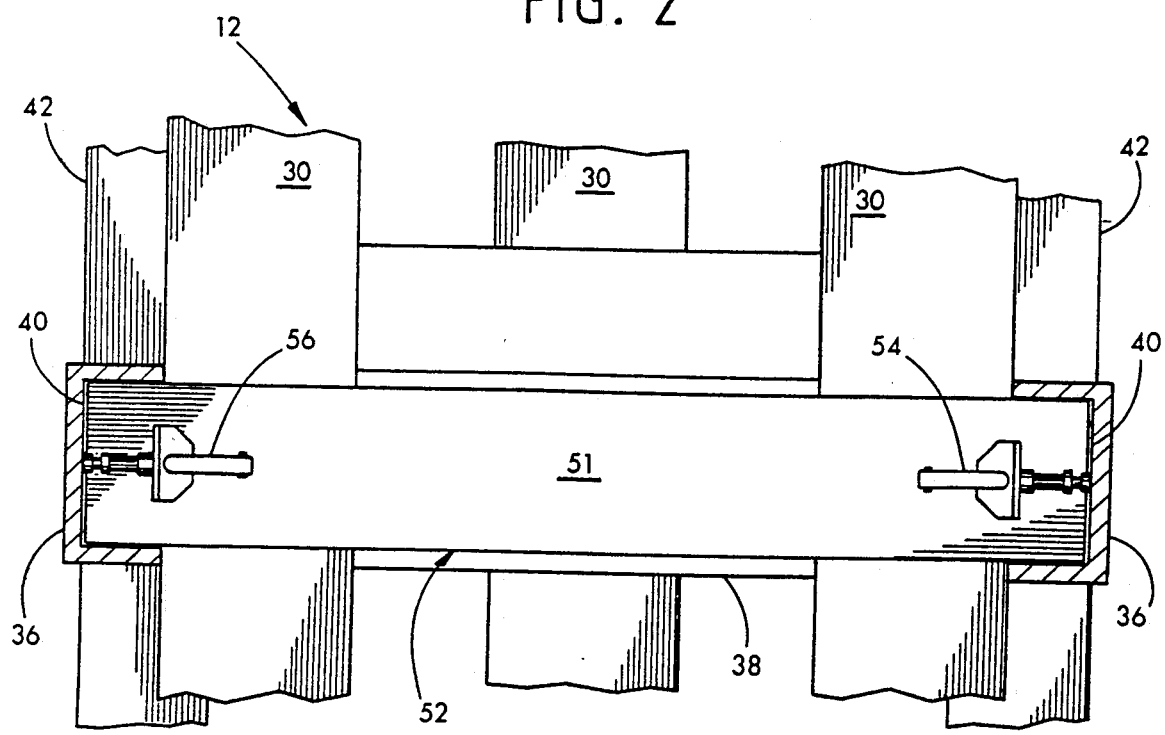
FIG. 3 is a section along line 3—3 of FIG. 1.

The movable platen 16 is attached to cross members 42 that are oriented perpendicular to the movable platen 16 and are parallel to the beams 30. As shown in FIGS. 1 and 2, each of the cross members 42 have two wheels 44 rotatably mounted upon pins 46 that extend through the cross members 42. The wheels 44 ride within channels 48 formed by the web and flanges of the outermost beams 30 of the base 12. The channels 48 act as guides for the wheels 44 to maintain perpendicularity of the movable platen 16 relative to the base and parallelism of the movable platen 16 relative to the stationary platen 14 during travel of the movable platen 16 toward and away from the stationary platen 14.

The lower electromagnet 18 and the upper electromagnet 22 are mounted within the frame 34 of the stationary platen 14; the lower electromagnet 20 and the upper electromagnet 24 are mounted within the frame 34 of the movable platen 16. The lower electromagnets 18 and 22 are fixedly mounted upon the horizontal member 36 proximate the base 12 of the respective platen 14 or 16. The upper electromagnets 20 and 24 are each mounted within shelf assemblies 50 and 52, respectively. Each of the shelf assemblies 50 and 52 include an upper ledge 51 and a lower ledge 53, the upper electromagnet 20 or 24 being sandwiched therebetween. The shelf assemblies 50 and 52 are each sized to slide within the channels 40 of the respective platens 14 and 16, thereby enabling the height of the upper electromagnets 20 and 24 relative to the base 12 to be adjustable. Each of the ledges 56 of the shelf assemblies 50 and 52 have toggle action push clamps 54 and 56 that may be used to secure the particular electromagnet 20 or 24 at a selected height. Such clamps 54 and 56 are well known, featuring a handle and plunger. As the handle is moved forward, the plunger moves forward and locks in position against the respective channel 40. When the handle is moved backward, the plunger is retracted and the height of the respective shelf assembly may be adjusted. Though the toggle clamps 54 and 56 are depicted in the drawings, it should be obvious that the shelf assemblies 50 and 52 may be moved up or down and locked in position by a number of alternate configurations. The height of each of the upper electromagnets 20 and 24 relative to the base 12 may therefore be adjusted so that the device 10 may accommodate different size molds, as explained further below.

A rod 58 of a hydraulic cylinder 60 is attached to the movable platen 16 at a horizontal beam 60. The extension and retraction of the rod 58 within the cylinder 60 causes the movable platen 16 to travel toward and away from the stationary platen 14, as described earlier. The hydraulic cylinder is positioned within the control panel 28 and is shown in dashed lines in FIG. 1. In FIGS. 4 and 5, a portion of the control panel is cutaway to show the hydraulic cylinder 60. The orientation of the movable platen 16 during travel induced by extension and retraction of the rod 58 within the cylinder 60 is maintained perpendicular to the base 12 and is parallel to the stationary base 14 by the guiding of the wheels 44 through the channels 48. The hydraulic hoses and connections for the cylinder 60 are not shown. Though the hydraulic cylinder 60 is a preferred method of causing the movable platen 16 to travel toward and away from the stationary platen 14, it is to be understood that there may be other means for moving the movable platen 16, for example, by a mechanical screw.

The device 10 includes wiring 62 and junction boxes 64 associated with the electromagnets 18, 20, 22, and 24. The control panel 28 has dials 66 and 68 that serve as rectifiers to control the current, and hence the electromagnetic forces, that emanate from the electromagnets 18, 20, 22, and 24. The dial 66 controls the electromagnets 18 and 22 of the stationary platen 14 and the dial 68 controls the electromagnets 20 and 24 of the movable platen. A control at 70 controls the hydraulics to extend or retract the rod 58 of the cylinder 60. The main power switch is shown at 72.

In the operation of the device 10, specific reference is made to FIGS. 4 and 5. A split mold 74 that has two halves 76 and 78 that are to be separated is positioned upon the base 12 with the first mold half 76 squarely against the stationary platen 14. The mold 74 is typically required to be separated for purposes of cleaning of the mold or retooling. The mold 74 is moved into position upon the base 12 by a crane or hoist. The height of the upper electromagnets 20 and 24 relative to the base 12 is adjusted to correspond to the height of the mold 74 by sliding of the shelf assemblies 50 and 52 to a position proximate the top of the mold halves 76 and 78. Each of the shelf assemblies 76 and 78 are then secured by the toggle clamps 54 and 56. The rod 58 of the hydraulic cylinder 60 is then extended so that the movable platen 16 travels toward the mold 74. When the movable platen 16 has traveled to the point where there is no clearance between the mold halves 76 and 78 and the platens 14 and 16, i.e. the first mold half 76 is flush against the stationary platen 14 and the second mold half is flush against the movable platen 16, the movement of the movable platen 16 is halted. FIG. 4 is a view showing this juncture in the sequence of operation.

At this point, the electromagnets 18, 20, 22, and 24 are activated. The electromagnets 18 and 22 exert an attractive electromagnetic force upon the first mold half 76 and the electromagnets 20 and 24 exert an attractive electromagnetic force upon the second mold half 78. The electromagnetic power of the magnets may be adjusted by the dials 66 and 68 according to the weight of the mold 74. When the dials 66 and 68 are properly adjusted, the first mold half 7 is held by the attractive electromagnetic force exerted by the electromagnets 18 and 22 to the stationary platen 14, and the second mold half 78 is held by the attractive electromagnetic force exerted by the electromagnets 20 and 24 to the movable platen 16, as the rod 58 is retracted into the hydraulic cylinder 60 and the movable platen 16 travels away from the stationary platen 14. The result is depicted in FIG. 5, where the mold halves 76 and 78 have been separated. Upon separation, the mold 74 may be cleaned, retooled, or otherwise maintained. In order to close the mold halves 76 and 78, the operation is performed in the reverse sequence as above described.

It is understood that the invention is not confined to the particular construction and arrangement of parts herein illustrated and described, but embraces such modified forms thereof as come within the scope of the following claims.

What is claimed is:

1. A device for separating and closing in a horizontal press a split mold having two halves to permit access to said mold halves, the device comprising:

(a) a base which the split mold may be positioned and supported, wherein the base has at least one horizontal beam adapted to carry the weight of the split mold positioned thereon;

(b) a stationary platen that extends upwardly from and is rigidly connected to the base and has an electromagnet mounted thereon capable of exerting an attractive electromagnetic force upon a first of the two halves of the split mold when the mold is positioned upon the base and the first of the two mold halves is positioned adjacent the stationary platen;

(c) a movable platen that extends upwardly from the base and that opposed the stationary platen, the movable platen capable of travel toward and away from the stationary platen and the movable platen having an electromagnet mounted thereon capable of exerting an attractive electromagnetic force upon a second of the two halves of the split mold when the mold is positioned upon the base and the second of the two mold halves is positioned against the movable platen;

(d) a cross member rigidly affixed to the movable platen and extending in the direction of the base beam and slidably engaged with the base beam to retain the perpendicularity of the movable platen relative to the base; and (e) means for moving the movable platen toward and away from the stationary platen, the movement of the movable platen toward the stationary platen acting to close the clearances between the halves of the split mold and the platens and the movement of the movable platen away from the stationary platen separating the first of the two mold halves from the second of the mold halves by the attractive electromagnetic force of the electromagnet of the stationary platen holding the first mold half against the stationary platen and the attractive electromagnetic force of the electromagnet of the movable platen holding the second mold half against the movable platen.

2. The device of claim 1 wherein the means for moving the movable platen is a fluid-powered cylinder.

3. The device of claim 2 wherein the cylinder is a hydraulic cylinder.

4. The device of claim 1 wherein each of the platens has two electromagnets, the first electromagnet located so as to apply an electromagnetic force proximate the bottom of the respective mold half and the second electromagnet located so as to apply an electromagnetic force proximate the top of the respective mold half.

5. The device of claim 4 wherein the first electromagnets are fixed to the platens and the second electromagnets are attached to vertically adjustable shelf assemblies mounted on the platens.

6. The device of claim 1 including means for varying electromagnetic force of the magnets.

7. The device of claim 1 wherein a channel is formed in the base beam that extends between the stationary platen and the movable platen, and the cross member rides within the channel to act as a guide for the travel of the movable platen.

8. The device of claim 1 further including a channel formed in the base member that extends between the stationary platen and the movable platen, the cross member having a plurality of wheels that ride within the channel to act as a guide for the travel of the movable platen.

* * * * *